United States Patent [19]

Daywalt et al.

[11] Patent Number: 5,197,446
[45] Date of Patent: Mar. 30, 1993

[54] VAPOR PRESSURE ENHANCER AND METHOD

[76] Inventors: Clark L. Daywalt, 6703 E. 27th St., Tulsa, Okla. 74129; Richard D. Collins, 302 W. Quanah Ct., Broken Arrow, Okla. 74011

[21] Appl. No.: 674,749

[22] Filed: Mar. 26, 1991

Related U.S. Application Data

[63] Continuation-in-part of Ser. No. 502,265, Mar. 29, 1990, Pat. No. 5,048,499.

[51] Int. Cl.$^5$ .................................. F02M 27/00
[52] U.S. Cl. ............................. 123/538; 210/696
[58] Field of Search ............. 123/1 A, 538, 196 R; 210/696, 168

[56] References Cited

U.S. PATENT DOCUMENTS

| | | | |
|---|---|---|---|
| 2,231,605 | 2/1941 | Stephenson et al. | 123/3 |
| 3,448,034 | 6/1969 | Craft et al. | 210/696 X |
| 3,486,999 | 12/1969 | Craft | 137/240 X |
| 3,597,668 | 8/1971 | Yoshimine | 123/538 X |
| 3,974,071 | 8/1976 | Dunn et al. | 210/696 |
| 4,217,221 | 8/1980 | Masso | 123/196 R X |
| 4,429,665 | 2/1984 | Brown | 123/1 A X |
| 4,715,325 | 12/1987 | Walker | 123/1 A |
| 4,820,422 | 4/1989 | Spencer | 210/696 |

*Primary Examiner*—Tony M. Argenbright
*Attorney, Agent, or Firm*—Keck, Mahin & Cate

[57] ABSTRACT

Device and method for treating liquids including fuels, oils and transmission fluids of an internal combustion engine. A treatment device that is in tubular form and contains a core having a central bore, radial, axially spaced bores and an annular collector space is used to contact the liquid. The core is an alloy of 68-100% copper, 0-30% zinc, 0-15% tin and 0-30% nickel.

5 Claims, 2 Drawing Sheets

VAPOR PRESSURE ENHANCER AND METHOD

This application is a continuation-in-part of co-pending U.S. patent application Ser. No. 07/502,265, filed Mar. 29, 1990, now U.S. Pat. No. 5,048,499, entitled FUEL TREATMENT DEVICE.

BACKGROUND OF THE INVENTION

1. FIELD OF THE INVENTION

The present invention pertains to a device for treatment of liquid substances used in combustion engines and motor vehicles, having multiple applications and to the method of treating. The present invention pertains to a treatment element for use in treating liquid substances to (i) improve the combustion characteristics of liquid fuels, (ii) improve the solubility and lubricating ability of motor oils, (iii) improve the solubility and lubricating ability of transmissions fluids, thereby dissolving the paraffin deposits causing the paraffin to remain in solution, and (iv) increase horsepower.

2. DESCRIPTION OF THE PRIOR ART

It is known from a number of prior art sources that metal alloys can be formed into treatment elements that can improve the characteristics of liquids that flow in contact with these elements. U.S. Pat. Nos. 3,486,999 and 3,974,071 show alloy elements that are employed to inhibit corrosion and/or scale deposits in the conduits of water systems. U.S. Pat. No. 3,486,999 teaches use of a self-sacrificing anodic element formed from a crystalline metallic alloy, preferably having copper, zinc and silicon as its primary elements, with lesser amounts of tin, lead, iron and nickel. U.S. Pat. No. 3,974,071 teaches use of alloys that are primarily copper, nickel, lead, zinc and tin, with small or trace amounts of iron, aluminum, phosphorus and chromium that are apparently consumed in use.

U.S. Pat. Nos. 4,429,665 and 4,715,325 show alloy elements that are employed to treat liquid fuels for improved combustion. U.S. Pat. No. 4,429,665 teaches use of a metal bar made of an alloy of nickel, zinc, copper, tin and silver. U.S. Pat. No. 4,715,325 teaches use of a non-conductive, non-sacrificing alloy of copper, zinc, nickel, lead and tin.

U.S. Pat. No. 3,448,034 teaches a fluid stabilizing alloy element believed to be effective to prevent precipitation of solids in the flow tubes of both oil and water wells. In this alloy, copper, zinc, nickel, lead and tin are present, with lesser amounts of iron, antimony, sulfur and manganese.

The above prior art references do not offer definite explanations of the phenomena leading to the desirable results achieved. In U.S. Pat. Nos. 3,486,999 and 3,448,034, a polarizing effect on the liquid flowing past the treatment element is mentioned. It is theorized that this eliminates any affinity between the mineral substances dissolved in the fluid treated and the flow tubes and other surfaces contacted by the fluid, thus preventing precipitation of minerals in solid form onto such surfaces. In U.S. Pat. No. 4,429,665 it is theorized that the fuel flowing past the treatment element is charged and the repulsion of charged particles increases the rate of fuel vaporization. An alternate theory offered is that application of an electrostatic charge redistributes the molecular pattern of the impurities.

Despite the absence of a firm theory of operation, a variety of benefits have been noted with the pre-existing treatment elements. U.S. Pat. No. 3,448,034 claims reduced accumulation of paraffin in oil well flow tubes. U.S. Pat. No. 4,429,665 claims greater fuel efficiency and cleaner exhaust emissions as a byproduct. U.S. Pat. No. 4,715,325 adds to those claims increased performance and cleaner fuel flow apparatus downstream of the alloy treatment element.

As has been noted in prior art, it has been found that various compositions of metal alloys have produced desirable effects in liquids. In Craft, 3,448,034, for water application, and in Walker, 4,715,325, for gasoline and diesel fuel application, the identical alloy composition consists of a preferred range of copper (57.64%), zinc (17.63%), nickel (13.45%), lead (7.66%), tin (2.69%), with trace elements of iron, antimony, sulphur and manganese. Walker, 4,715,325, further teaches the ranges may be varied to 40–66% copper, 2–28% zinc, 5–25% nickel, 2–12% lead, and 1–5% tin; and also teaches that the desired results are not achieved when any one of the above metals are deleted from the crystalline metal. In Brown, 4,429,665, for gasoline application, it teaches the use of a composition of 30–60% copper, 15–40% zinc, 10–30% nickel, 5–2% tin, and 1–10% silver; with a preferred range of 42% copper, 25% zinc, 21% nickel, 10% tin, and 2% silver, with a platinum coating preferably applied on either end of the elongated metal bar. While the prior art provides a desirable effect, what is needed is a device consisting essentially of a metal component that will more effectively produce the desired result and enhance the qualities of the liquids.

It is necessary in all applications to avoid restricting fuel flow either because the peak fuel needs may not be met or because the velocity losses involved with flow restriction may unduly increase the energy needed to pump fuel through the system. Accordingly, what is needed is a fuel treatment device that offers adequate surface area for fuel contact and a configuration that causes the required turbulence without "choking off" the flow needed for the fuel system. Prior art does not provide for the needed turbulence.

SUMMARY OF THE INVENTION

A liquid substance treatment device in accordance with the present invention is an element consisting essentially of the following: copper, zinc, nickel and tin. The working composition of the invention is: 68–100% copper, 0–30% zinc, 0–30% nickel, 0–15% tin. The present invention has conductive and other properties to cause the composition of liquid substances to increase in vapor pressure and decrease in surface tension, providing for a hotter, consequently cleaner burning fuel, and making the liquid fuels, oils and water more soluble.

The United States government required vehicles to use only unleaded fuel in order to reduce pollution. Catalytic converters on vehicles were mandated to reduce harmful emissions, requiring unleaded fuels to be used. It is known that lead has harmful effects on living organisms and efforts have been made to eliminate lead from paint, plumbing fixtures, water treatment, and gasoline. In the case of fuels used in combustion engines, adding lead, or allowing the fuel to come in contact with lead, may have harmful effects on the catalytic converter and eventually on living organisms. The present invention has shown that lead is not necessary to achieve the desired results, and that the results are improved over prior art.

One object of the invention is to provide a fuel treatment device, method and apparatus for improving performance and combustion efficiency in an internal combustion engine thereby increasing horsepower and decreasing exhaust emissions.

An additional object of the invention is to provide a treatment device which will increase the soluble qualities of both motor oils and transmission fluids thereby dissolving and causing the paraffin to remain in solution.

The following tests were conducted to show the effects of the invention: (1) Testing was conducted by United States Testing Company, Inc., Tulsa Division, Tulsa, Okla., which reported an increase in vapor pressure in the treated fuel. (2) The University of Tulsa, College of Engineering and Applied Sciences in Tulsa, Okla., conducted gas chromatograph mass spectrochemical analysis and found there was no chemical change to the fuel treated with this invention. (3) Dynamometer testing was conducted by Boyd's Racing Engines, Norman, Okla., on a 350 Chevrolet engine. A series of tests were conducted in sequence to establish an average. Readings were taken at 250 RPM intervals between 2750 and 4500 RPM and recorded an increase of up to seven horsepower with the invention. (4) Tests were also conducted on a 1985 Dodge Diplomat with an accumulation of 24,930 miles, using a Bear Four Gas Analyzer to measure the hydrocarbon (HC) emissions by comparing emissions utilizing (i) untreated unleaded gasoline, (ii) Walker's invention, and (iii) the present invention using 99.99% pure copper. A series of tests were conducted to obtain an average of each category of the above, with the results showing a reading of (i) 25.3 ppm (parts per million), (ii) 24 ppm, and (iii) 10.6 ppm. The Walker invention produced a 5% reduction in HC, while the present invention produced a 58% reduction in HC. This invention clearly was effective in HC reduction. The same vehicle had recorded milage prior to testing of 17 MPG. After installation of this invention the mileage increased to 24 MPG over a 4000 mile trip. (5) A series of emissions testing was conducted on a 1989 Ford Taurus with 9,318 miles usage to measure HC and carbon monoxide (CO). The baseline test average showed HC of 87.5 ppm and CO of 0.02%. Next a composition of 63% copper the readings were HC 73 ppm and CO 0.025%. Immediately after installation of this invention using 99% copper the readings were HC 61.5 ppm and CO 0.03%. After accumulation of 2060 miles another test series was conducted and showed HC 11.6 ppm and CO 0%. (6) A fuel consumption test was conducted by using an eight horsepower, 3600 watt gasoline generator set using regular unleaded gasoline to compare the results of (i) consumption of untreated regular unleaded gasoline, (ii) consumption of fuel treated with the composition of Walker, 4,715,325, teaching a preferred 57% copper, (iii) consumption using the present invention utilizing 99.99% pure copper, and (iv) consumption using the present invention utilizing an alloy of 88% copper, 10% tin, and various trace elements. A series of consecutive tests were conducted to establish an average time of consumption of 250 ML of gasoline by each of the four categories being compared. The baseline of the untreated fuel showed an average consumption time for each of the above was (i) 1054.6 seconds, (ii) 1066.6 seconds; (iii) 1102.8 seconds; and (iv) 1099 seconds. The results showed the Walker invention improved consumption time by 1.14%, the present invention of 99.99% copper improved by 4.57%, and the present invention using an 88% copper alloy improved by 4.27%. The last two tests clearly show an improvement of over 300% of the present invention over the Walker art.

Thus the present invention claims that copper is the active ingredient and that eliminating lead would be beneficial. While pure copper will achieve extremely desirable effects, the machinability of copper is enhanced by adding nickel, tin and/or zinc. Desired effects may be achieved by staying with an element consisting essentially of 68-100% copper, 0-30% zinc, 0-15% tin, and 0-30% nickel.

It is essential to create the required turbulence to achieve the desired results, and many designs using the present invention can accomplish this. The accompanying drawings show an example of one design to effectively produce the required turbulence and surface area causing the interaction between the liquid substance and the metal component which produces the desired effect. This one particular design is an elongated bar having an outer surface and a central axis extending between first and second ends in the direction of elongation. A central axial bore exists within the metal component and extends along the central axis from an inlet opening at the first end of the component to within a short distance of the second end of the component. A plurality of radial bores axially spaced communicate between the outer surface of the component and the central bore. Each said radial bore has a cross-sectional area that is at least approximately an order of magnitude smaller than the cross-sectional of the central bore, and all radial bores together have a cross-sectional area about equal to that of the central bore. One of the effects of this design is to provide the required treatment in the flow path of the liquid substance that enhances the surface interaction between the metal component from which the device is made and the liquid substance being brought into contact with it, creating the needed turbulence and surface contact with the component.

DESCRIPTION OF THE EMBODIMENTS OF THE DRAWINGS

While the present invention is applicable to a variety of situations in which it is desired to (i) increase the combustion efficiency of liquid fuels including, but not limited to, gasoline (both leaded and unleaded), diesel fuel, methanol, alcohol, and LPG; or to decrease the buildup of precipitated deposits from such fuels, (ii) improve the solubility and lubricating ability of motor oils, and (iii) improve the solubility and lubricating ability of transmissions fluids, thereby dissolving the paraffin deposits causing the paraffin to remain in solution; a primary expected field of application is in internal combustion engine fuel delivery systems and in lubricating systems. An example of one design structure of an individual treatment element will be explained next.

Figure 1:
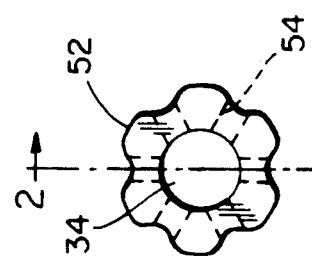
FIG. 1 is an end view of a single treatment element in accordance with the present invention.
Figure 2:
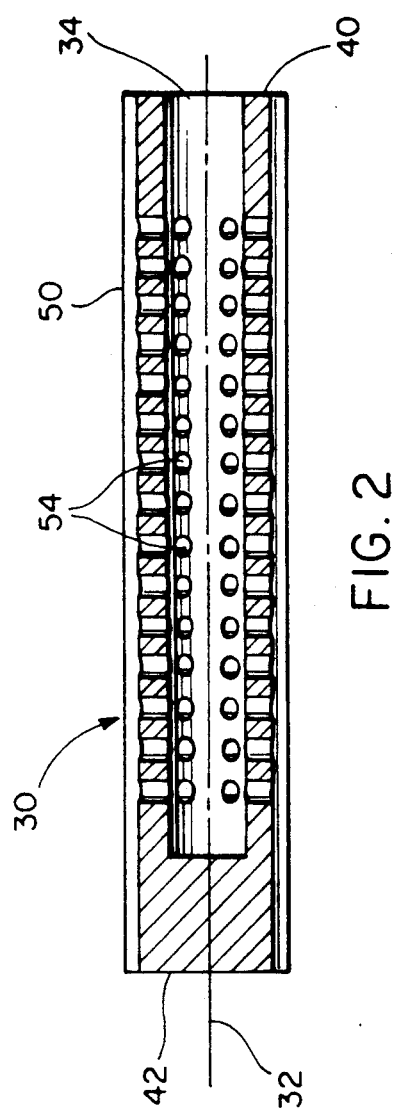
FIG. 2 is a cross-sectional view of a treatment element in accordance with the present invention taken along line 1b–1b in FIG. 1.

FIGS. 1 and 2 show, respectively, an end and a cross-sectional view of an example of an individual treatment element 30 in accordance with the present invention. The element 30 is elongated and generally cylindrical in shape, with a central axis 32 extending along its length. The outer surface 50 has a set of longitudinal ribs 52 that extend from a first or inlet end 40 to a second, closed end 42. Within the element 30 there is a central bore 34 that extends from the inlet end 40 to within a short distance of the second end 42. As can be seen the use of a central bore 34 greatly increases the surface area for contacting the liquid substance, better utilizing the volume occupied by the element 30.

To produce a combination of turbulent and laminar flow that is required to fulfill the objectives of the invention, a set of radial bores 54 axially spaced communicates between the central bore 34 and the exterior surface 50. The radial bores 54 are aligned in rows in the valleys between the ribs 52. In addition, the radial bores 54 are also aligned in circumferential rings.

In the preferred embodiment shown in FIGS. 1 and 2, the element 30 has multiple ribs 52 with multiple corresponding valleys. There are a number of radial bores 54 aligned in each valley, yielding a multiplicity of axially spaced bores. Also significant for the radial bores 54 is their total cross-sectional area. It is important to the interaction of the liquid substance and element that turbulence be created to cause the liquid to be forced into contact with the metal material from which the element 30 is made without causing a restriction within the element 30. Accordingly, the configuration example for the treatment element 30 of the present invention represents a careful balancing of forced contact between liquid and metal component and avoiding undue flow restriction. As will be seen below, when one or more treatment elements are installed in a treatment assembly 20, the elements are contained within a housing that forces the majority of the liquid flowing in the flow path to enter the opening at the inlet end 40 and flow into the central bore 34. The liquid that enters the central bore 34 can only exit through the radial bores 54.

While it is necessary to avoid flow restriction, it is also necessary to create turbulence in the liquid to enhance surface contact. The size and orientation of the radial bores 54 together with the closed end 42 are important in causing turbulence. Liquid flowing parallel to the central axis 32 must make a turn to escape through an axial bore 54. In addition, each radial bore 54 has a relatively small cross-sectional area (measured perpendicular to the central axis of the bore) preferably approximately at least an order of magnitude less than the cross-sectional area of the inlet end 40. This small cross section of the radial bores 54 forces the liquid into contact with the surface of the element 30, if this has not already occurred as the liquid flows into the central bore 34. To counteract the flow restriction in individual axial bores 54, the size and number of radial bores 54 is selected such that the total cross-sectional area of the radial bores 54 is at least twice the cross-sectional area of the element 30 at the inlet end 40 (measured perpendicular to the central axis 32).

As noted above, the element 30 is configured in a housing such that the majority of the liquid enters the central bore 34 and must exit via the radial bores 54.

Liquid that does not enter the central bore 34 flows in a relatively smooth path along the ribs 52 of the outer surface 50. But this smooth flow, which would occur primarily in the valleys between ribs 52, is interrupted by the liquid exiting from the radial bores 54. Turbulence is induced by the collision of the relatively smoothly flowing liquid proceeding along the outer surface 50 in a direction parallel to the central axis 32 and the liquid exiting axially outward from the radial bores 54. The liquid that was forced to make a turn to exit from the central bore 34 now must make another turn to resume flow in the axial direction.

Figure 3:
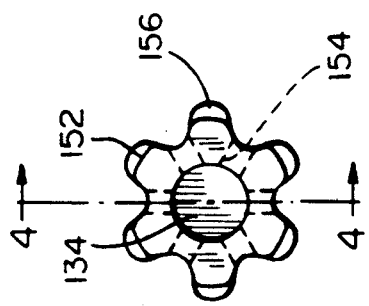
FIG. 3 is an end view of an alternate embodiment of the treatment element of the present invention.
Figure 4:
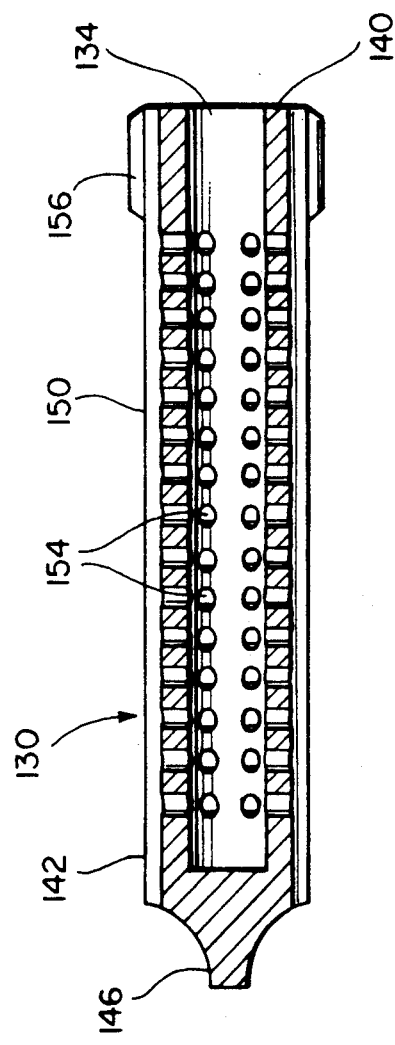
FIG. 4 is a cross-sectional view of a treatment element in accordance with the present invention taken along line 3b–3b in FIG. 3.
Figure 5:
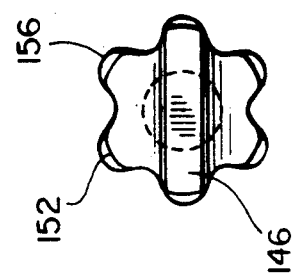
FIG. 5 is an end view of the treatment element of FIG. 4, viewed from the opposite end.
Figure 6:
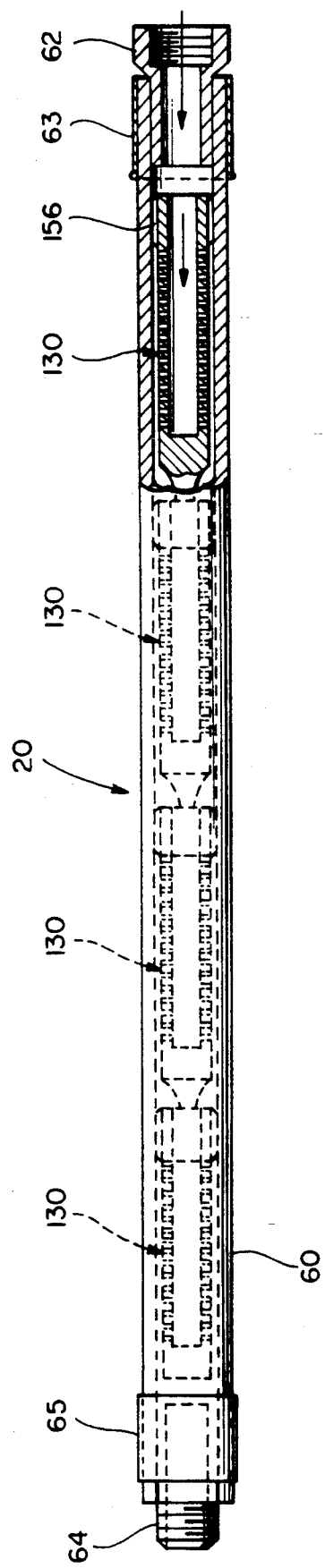
FIG. 6 is a partial cross-sectional view of a treatment assembly containing multiple treatment elements.

FIGS. 3, 4 and 5 show a treatment element 130 that is an alternate embodiment of the present invention. It differs from the element 30 shown in FIGS. 1 and 2 in two major respects. First, it has fins 156 extending outwardly from the ribs 152 for a short distance along the outer surface 150 near the inlet end 140. These fins 156 are used to help establish a firm fit of the element within a housing 60, such as is explained next. Second, the second end 142 tapers to form a flange 146, rather than a blunt end as in FIG. 2. The element 130 has essentially the same cross-sectioned area ratios as described for the element 30 of FIGS. 1 and 2. FIG. 6 shows a treatment element assembly 20 that incorporates one or more of the individual treatment elements 30, 130 as shown in FIGS. 1, 2, 3, 4 and 5 above. The housing 60 may be almost any form of conduit having an inner diameter slightly larger than the outer diameter of the elements it contains. The inner diameter of the housing 60 is chosen to provide a snug fit with the fins 156, when the embodiment 130 as shown in FIGS. 3–5 is used. When the embodiment 30 as shown in FIGS. 1–2 is used, the housing should also fit relatively close around the outer surface 50 of the element 30.

As seen in FIG. 6, when multiple elements 130 are placed within the housing 60, they may be positioned in series with their inlet ends facing the liquid flow. This is to insure that the liquid passes into the central bore 134 of one or more of the elements 130 taking a path that insures greater turbulence. An inlet nipple 62 secured by a retainer band 63 on the outside of the inflow end of the housing 60 provides a connection for the liquid flow line. An outlet nipple 64 secured by a retainer band 65 at the outflow end of the housing 60 provides a connection to the liquid line leading to the engine. To help avoid occlusion of the inlet end 140 of any element 130, each element 130 has a broad point or flange 146 (as shown in FIGS. 4 and 5) that extends from the closed end 142. Thus, should the flanged end 146 of any element 130 butt up against the inlet end 140 of any adjacent element, the flange 146 will ensure that most of the inlet end 140 remains unobstructed and available for entry of liquid into the central bore 134.

It is necessary for the majority of the liquid flowing into an element 130 placed within a housing 60 to enter the central bore 134 so that it will be forced through radial bores 154 axially spaced. To encourage this, the diameter of the central axial bore 134 is preferably at least approximately one-half of the outer diameter of the element 130. The central bore is preferably made as large as possible, given the ribbed structure of an element 130. Obviously, the amount of metal material remaining in the valleys between the ribs 152 must be sufficient to maintain the structural integrity of the element 130. Another factor in determining how much liquid flow enters the central bore 134 is the internal diameter of the housing 60 relative to the outer diameter of the element 130. As best seen in FIG. 6, the fit between the element 130 and the interior of the housing 60 is relatively snug, with spacing around the outer surface 150 of the element 130 being determined primarily by the diameter of the element 130 at the fins 156 relative to the diameter of the element 130 at the ribs 152 and the depth of valleys between the ribs 152. Preferably, the somewhat annular, cross-sectional area available for flow between the outer surface 150 of an element 130 and the inner surface of the housing 60 does not exceed the smallest cross-sectioned area of the central bore 134 of an element 130.

The element used in the present invention consists essentially of 68-100% copper, 0-30% zinc, 0-15% tin, and 0-30% nickel. The present invention claims desirable results when introduced to the liquid stream. It may be formed into the general elongated, ribbed shape shown in FIGS. 1, 2, 3, 4, and 5 by a conventional sand casting, investment casting or other similar foundry process or by machining. The central bore 34 or 134 and the radial bores 54 or 154 may be achieved by casting or drilling.

In use, a treatment device in accordance with the present invention may be installed in the engine fuel line or the invention may be used to batch treat liquid fuel in the storage facility or during transportation; or may be installed in the lubricating systems of the oil or transmission fluids, or may be used to batch treat these fluids. It has been observed that there may be an initial increase in emissions from the engine immediately after installation while the fuel system is being affected by the treated fuel due to increased solubility causing carbon deposits in the system to dissolve and return to the liquid to be burned in the combustion process. After a short period of time both fuel economy and emissions in the form of HC (hydrocarbon) and CO (carbon monoxide) are measurably improved.

In sum, it can be seen that the present invention teaches how a treatment element can be configured and used in fuel flow lines to improve combustion. While application in internal combustion engines is contemplated and has been found to improve engine performance, increase miles per gallon, decrease HC and CO emissions and to clean fuel contacted surfaces of carbon deposits, other applications are possible, for example, use in oil fueled heaters or in storage or delivery systems for fuels is also possible.

The present invention also teaches a beneficial effect when used in conjunction with motor oils and transmission fluids by causing greater soluble qualities in those fluids by dissolving paraffin build up, increasing the lubrication qualities of those fluids, and allowing more efficient operation of the engine.

In use, a treatment device in accordance with the present invention was installed in the transmission fluid line leading to the radiator of a 1981 Pontiac Grand Prix. It has been observed that the paraffin accumulated in the transmission system was dissolved and remained suspended therein; also, an improvement in the quality of shifting was observed.

In use, a treatment device in accordance with the present invention was used to treat the motor oil of a 1981 Oldsmobile Ninety-Eight. Prior to treatment of the oil, it was observed that paraffin deposits had accumulated on top of the engine block when the heads and intake manifold were removed. After reassembly of the engine and use of the treatment element, an inspection indicated that the paraffin deposits had dissolved; also, the engine operated more efficiently and smoothly, i.e., quieter.

It will be seen that certain modifications can be made to the invention while maintaining its effectiveness. It should be apparent that the invention is not limited to the form shown in the examples, but various changes and modifications may be used to provide the needed turbulent flow and surface contact. For example, the configuration of the outer surface of an element or of its central bore could be changed somewhat. Placement of axial bores and relative cross-sectional area of axial bores individually and in total relation to the cross-sectional area of the central bore could also be varied somewhat while preserving the features of causing turbulence and forcing contact with the element without unduly restricting flow. Accordingly, the scope of the invention is to be governed by the appended claims rather than the above disclosure.

What is claimed is:

1. A treatment device for enhancing the vapor pressure of liquid hydrocarbons comprising an element consisting essentially of from at least 68% to 100% copper, from 0% to about 30% zinc, from 0% to about 15% tin and from 0% to about 30% nickel alloyed together for the treatment of liquid hydrocarbons including fuels, motor oils, and transmission fluids by turbulent flow of the liquid in contact with the device.

2. A method for treating liquid fuels including gasoline, diesel fuels, methanol, alcohol fuels, LPG, special high octane fuels for racing engines, and aircraft fuels; comprising the step of contacting the fuels while flowing turbulently within a treatment device comprising an element consisting essentially of from at least 68% to 100% copper, from 0% to about 30% zinc, from 0% to about 15% tin and from 0% to about 30% nickel alloyed together to increase vapor pressure, reduce HC and CO emissions, increase engine performance and decrease fuel consumption.

3. A method for treating motor oils comprising the step of contacting the oil while flowing turbulently within a treatment device comprising an element consisting essentially of from at least 68% to 100% copper, from 0% to about 30% zinc, from 0% to about 15% tin and from 0% to about 30% nickel alloyed together for causing the oil to become more soluble, increasing the vapor pressure of the oil and dissolving paraffin build up, thus increasing the lubrication qualities of the oil, and allowing more efficient operation of the engine.

4. A method for treating transmission fluids comprising the step of contacting the transmission fluid while flowing turbulently within a treatment device comprising an element consisting essentially of from at least 68% to 100% copper, from 0% to about 30% zinc, from 0% to about 15% tin and from 0% to about 30% nickel alloyed together for causing fluids to become more soluble, and dissolving paraffin build up, thus increasing the vapor pressure of the fluids, increasing the lubrication qualities of the fluid, and allowing more efficient operation of the transmission.

5. A method of testing hydrocarbon liquids including fuels, motor oils and transmission fluids comprising the step of contacting the hydrocarbon liquid while flowing turbulently within a treatment device comprising an element consisting essentially of from at least 68% to 100% copper, from 0% to about 30% zinc, from 0% to about 15% tin and from 0% to about 30% nickel alloyed together for causing the hydrocarbon liquid to become more soluble to dissolve paraffin build up and to increase vapor pressure, thus increasing the lubrication qualities of the liquid.

* * * * *

UNITED STATES PATENT AND TRADEMARK OFFICE
CERTIFICATE OF CORRECTION

PATENT NO. : 5,197,446

DATED : March 30, 1993

INVENTOR(S) : Clark L. DAYWALT et al.

It is certified that error appears in the above-identified patent and that said Letters Patent is hereby corrected as shown below:

Column 8:

Claim 5, line 1, change "testing" to --treating--.

Signed and Sealed this

Eleventh Day of January, 1994

Attest:

BRUCE LEHMAN

Attesting Officer — Commissioner of Patents and Trademarks